Oct. 31, 1950  F. L. GRANER  2,528,051
SEDIMENTATION APPARATUS
Filed Aug. 6, 1946  5 Sheets-Sheet 1

INVENTOR:
FRANK L. GRANER
BY
Arthur Middleton
his ATTORNEY

Oct. 31, 1950          F. L. GRANER          2,528,051

SEDIMENTATION APPARATUS

Filed Aug. 6, 1946          5 Sheets-Sheet 3

INVENTOR:
FRANK L. GRANER
BY
his ATTORNEY

Oct. 31, 1950     F. L. GRANER     2,528,051
SEDIMENTATION APPARATUS
Filed Aug. 6, 1946     5 Sheets-Sheet 5

INVENTOR:
FRANK L. GRANER,
BY
Arthur Middleton
ATTORNEY ic

UNITED STATES PATENT OFFICE 2,528,051

SEDIMENTATION APPARATUS

Frank L. Graner, New York, N. Y., assignor to The Dorr Company, New York, N. Y., a corporation of Delaware Application August 6, 1946, Serial No. 688,628

15 Claims. (Cl. 210—55)

This invention relates to sedimentation units and apparatus and more particularly to a novel sediment-raking mechanism employable therein or constituting a part thereof. A raking mechanism embodying the invention hereof is of a form adaptable for raking of the sedimented material found in the bottom of a settling tank or thickener and for impelling the same to a locality or receiving sump from which the thus raked and transferred material is deliverable to a region outside of the tank.

Sedimentation apparatus for which the invention hereof is particularly adaptable is frequently referred to as clarifiers, as thickeners or as hydroseparators. As illustrative of the type of apparatus to which the invention is applicable, reference is made to the Scott Patent No. 2,087,725, granted July 20, 1937, or to the Scott Patent No. 2,291,836, granted August 4, 1942.

More particularly, the invention hereof revolves about a novel and effective form of raking mechanism which comprehends (1) a liftable rake arm carrier, which as shown, is in the form of a vertically-extending hollow shaft carried from a turnable member of a vertically liftable bearing construction and whereby it can be raised while turning about a vertically-extending axis, from the lower end portion of this liftable carrier there is carried outwardly-extending rake arms which in plan have symmetrical arrangement with respect to each other and from which there depend raking blades constituting sediment-engaging and impelling elements; (2) means for raising said rake arm carrier, or the liftable supporting bearing construction therefor, whereby excessive overload raking conditions on the raking arms can be avoided or minimized; (3) a turnable torque member in the form of a hollow shaft surrounding the liftable carrier shaft and mounted in a suitable bearing whereby it has concentric arrangement with respect to the liftable carrier shaft and whereby the torque member or shaft is in the construction shown supported in a constant position of elevation therefor; (4) means for imparting a turning movement to the torque shaft, or drive tube as said member is sometimes called, by forces applied at the upper end thereof; and (5) outwardly-extending relatively stiff power-transmission arms, there being one arm for and corresponding to each rake arm, the inner ends of which power-transmission arms are connected to the lower end of the torque tube so as to have horizontal turning movement imparted thereto by the torque tube as it turns, the connection just referred to being provided by hinge elements of which the pintle axis extends horizontally, or substantially so, whereby the outer ends of the arms can have an up and down swinging movement for a reason which will presently become apparent. A link is provided as a yieldable connecting means functionable between the outer end of each power-transmission arm and the rake arm corresponding thereto. The construction of the link just referred to is such that a driving horizontal turning movement can be imparted from each outwardly-extending power-transmission arm through the link to the corresponding rake arm in diverse vertical positions for the latter. This link connection is a provision to allow requisite relative in-and-out movement of the free end of the transmission arm relative to the rake arm as the latter is lifted but for preventing any lateral movement of the end of the power-transmission arm relative to the rake arm to which it corresponds.

In the apparatus shown, the internal diameter of the torque tube is substantially larger than the outside diameter of the liftable shaft of the rake-arm carrier and there is provided between the lower interior end portion of the torque tube and the liftable shaft means serving as a steady bearing for maintaining alignment of the shaft particularly in the situation where only two rake arms are employed. More specifically, an important feature of the invention resides in making the hingedly mounted power-transmission arms of a form which in plan resemble a V or modified form of V of which the open end of the V is located innermost and has a plurality of horizontally spaced hinge connections between it and a corresponding frame structure provided at and on the lower end portion of the liftable carrier shaft.

The objects and features of the invention and of the advantages thereof will become manifest from and are set forth in the following description:

In the following description and in the claims hereof parts will be identified by specific names for convenience, but they are intended to be generic in their application to similar parts as the art will permit.

In the accompanying drawings there has been illustrated an embodiment of the invention as developed by me, but such embodiment is understood to be regarded as typical only of many possible embodiments and the invention is not limited to the exact form shown. The novel features considered characteristic of my invention are set forth with particularity in the appended claims.

The invention hereof will be readily understood from the following description of the specific embodiment shown particularly when read in conjunction with the accompanying drawings constituting a part of this specification.

In said drawings:

In Fig. 2 the parts are shown at a smaller scale than in Fig. 1.

Fig. 3 is at a scale larger than that of Fig. 1.

In Fig. 4 the parts are shown in somewhat larger scale than in Fig. 1.

Figs. 5, 6, 7 and 8 are illustrative of certain parts shown in Figs. 1 and 4, to wit, at a scale somewhat larger than that of Fig. 1 and somewhat smaller than that of Fig. 4.

In connection with the foregoing, it will be noted that—

Figs. 9 to 11 are illustrative of a modified form of the raking mechanism and in this connection it will be noted that—

In Figs. 16, 17 and 18 the several parts are at larger scale than in Fig. 4.

Figures 1, 2, 3:
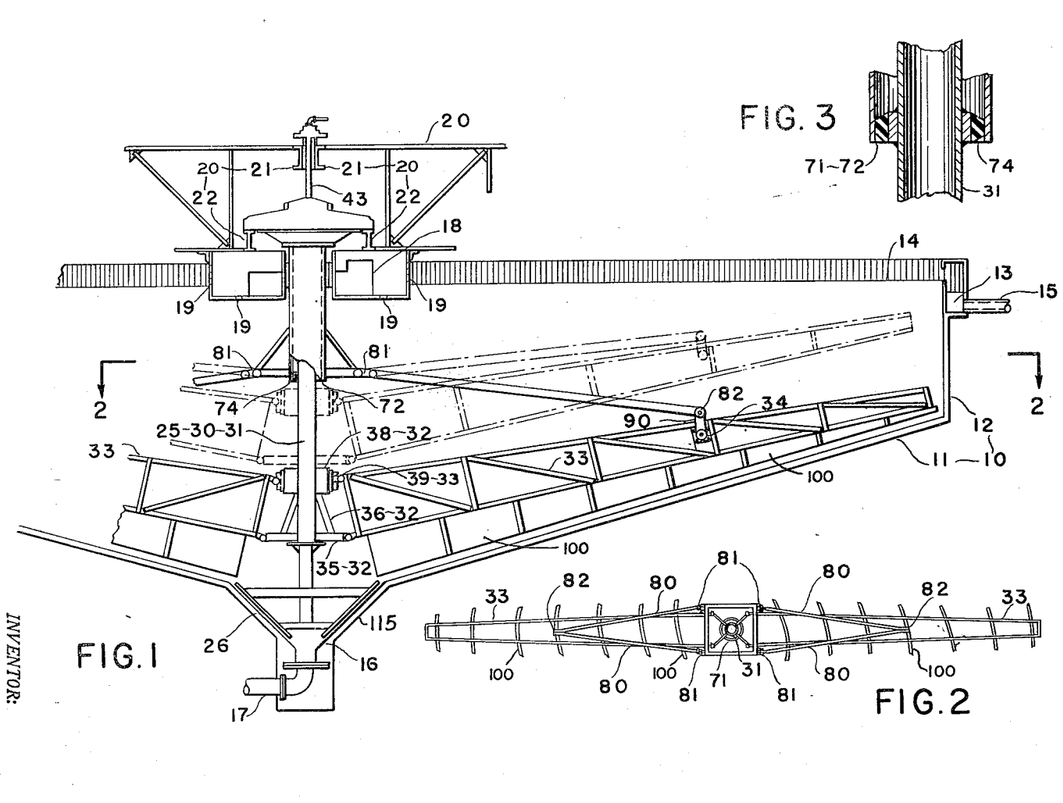
Fig. 1 is a vertical sectional view of a portion of a sedimentation tank having a marginal wall symmetrical in plan—which may be a cylindrical wall—and of a raking mechanism associated therewith embodying the invention hereof. In this view a portion of the tank or basin and a portion of the raking mechanism has been omitted or broken away, to wit, a portion at the left of the vertical shafts shown therein.
Fig. 2 is a diagrammatic plan view of a pair of outwardly-extending rake arms and of a pair of outwardly-extending power-transmission arms associated therewith, and of portions of the carrying sections of the rake arm carrier and of portions of the hinge members by which the power-transmission arms are connected to the torque tube. This is a view taken as on a plane indicated by the line 2—2 of Fig. 1 looking in the direction of the arrows.
Fig. 3 is a detail showing a steady guide bearing employable between the lower interior end of the torque tube or shaft and the exterior of the liftable rake carrier shaft.

Reference is now made to the drawings in detail:

A portion of the sedimentation tank 10 is shown in Fig. 1. It embodies a floor or bottom portion 11, a marginal wall 12, which may be a cylindrical wall rising from the bottom portion 11, a marginal launder 13 which receives supernatant liquid overflow passing thereinto from the overflow or weir edge 14, and effluent outflow pipe 15 leading from the launder 13, a sediment-receiving and discharge section provided by sump or depressed portion at 16 and a sediment-discharge conduit 17 leading from the sump to a region outside of the tank.

Liquid to be treated for the removal of settleable material therefrom is supplied to the upper central itnerior portion of the tank through the medium of a feed-supply means terminating in the feed distributing well 18 having apertured feed discharge openings as at 19.

Also associated with the tank and constituting a part of the sedimentation apparatus as a whole there is a frame structure 20 stationarily positioned with respect to the tank. This framework serves as a support for a portion of said supply means and the feed-well 18 thereof.

Sediment-raking mechanism collectively designated as 25 comprises a liftable rake-arm carrying member 30 embodying a vertically-extending arm-carrying shaft 31 with an arm connecting body or intermediate frame structure 32 at the lower end portion thereof and a set of rake arms collectively designated 33. The body or intermediate frame structure just designated as 32 comprises connecting elements such as braces and struts 35 and 36 and connecting members as 37 and 38 for use in securing and supporting the inner ends 39 of the rake arms 33 as will hereinafter more fully appear. The structural parts just referred to are clearly indicated or shown in Figs. 1 and 4 and in this connection it will be noted that as part of the raking mechanism is carried by the shaft 31 there is a sump rake 26 which is movable with the shaft 31. In other words, the sump rake 26 not only turns with the shaft 31 but is also liftable with the latter as it is raised.

Figure 4:
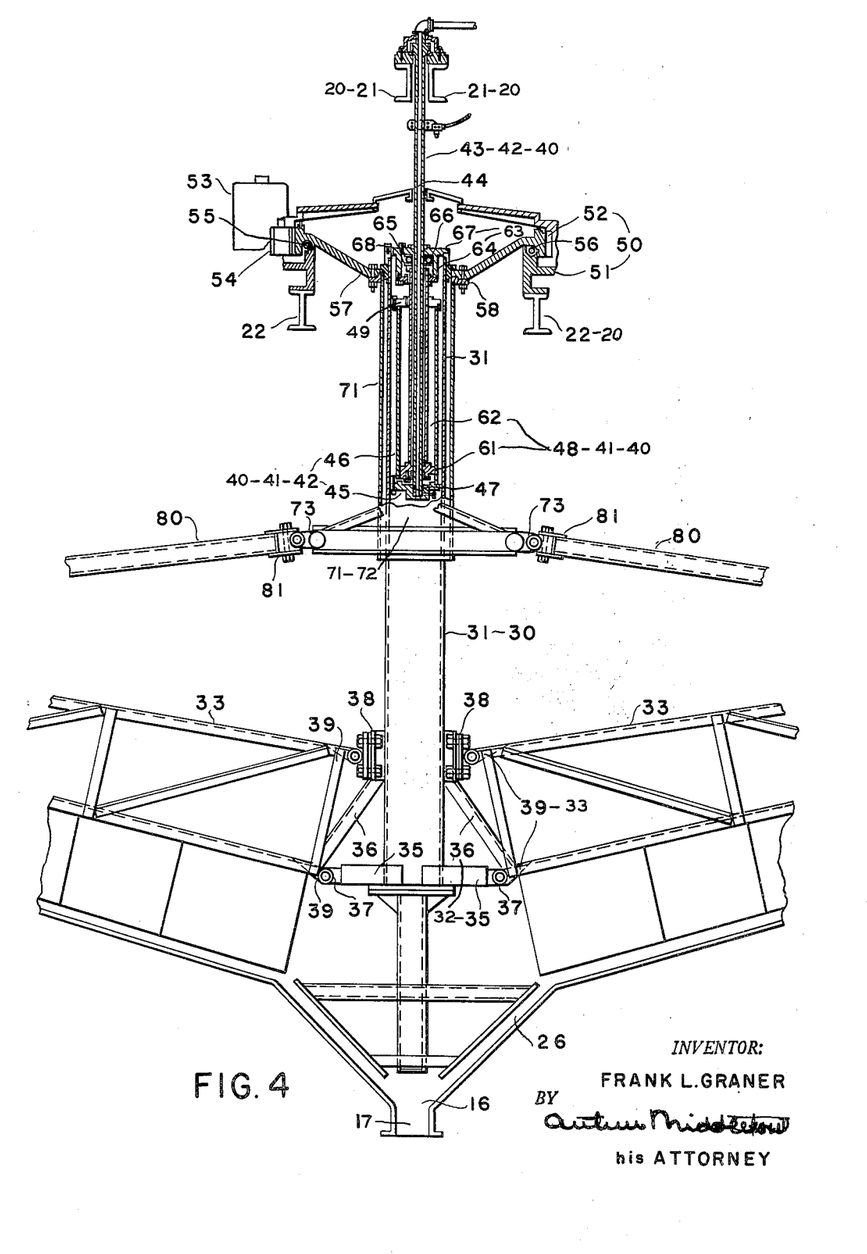
Fig. 4 is a vertical view partially in section illustrative of the central portion of the several parts embodied in the novel raking mechanism. This view is illustrative of the manner in which these parts are supported and arranged in and with respect to the bottom of the sedimentation tank or basin floor on the one hand and on and with respect to the stationary supporting structure associated with the tank or basin on the other hand.
Figure 16:
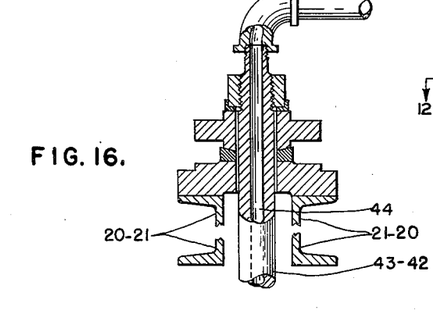
Figs. 16, 17 and 18 are vertical sectional views of certain parts of the operating and lifting mechanism shown in the upper portion of Fig. 4.
Figure 17:
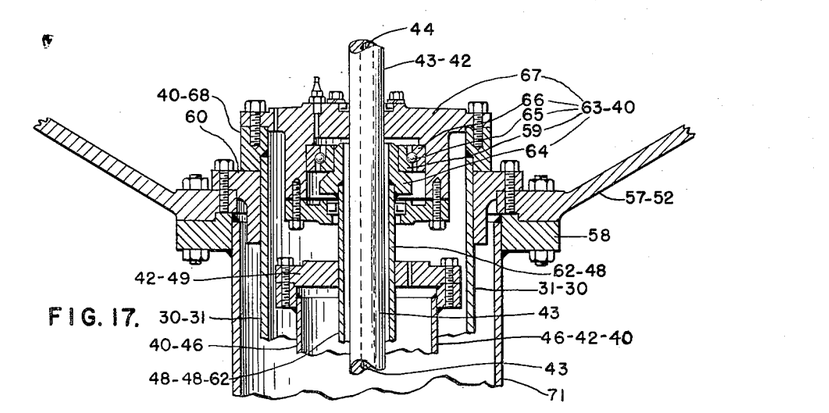
Figure 18:
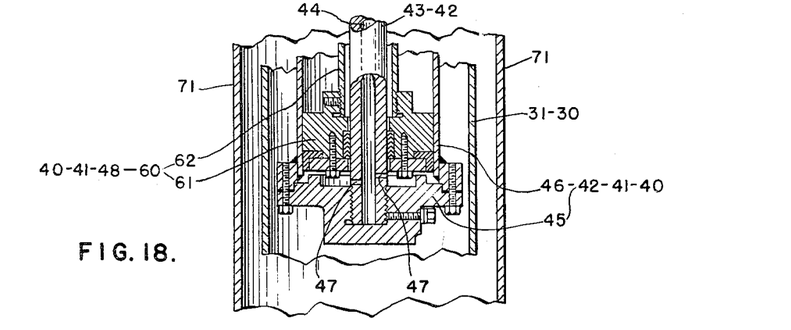

In Fig. 4, which is further exemplified by the larger scale detail sectional views of Figs. 16, 17 and 18, there is shown a lifting means, collectively designated as 40 which is so supported that upon expansion of an expansible and contractible element designated as 41 the shaft 31 of the rake-arm can be raised through the medium of a turnably mounted liftable supporting member 67, to wit, through the medium of pressure liquid supplied into the expansible lifting element 41 as will hereinafter more fully appear. Such supply of pressure liquid is through a tubular liquid supply member 43 having a flow passageway 44. This tubular liquid supply member 43 which is sometimes referred to as a center support tube derives carrying support therefor from a pair of stationary channel-shaped members 21 constituting part of the aforementioned stationary framework 20.

In this same figure there is shown a pair of I-beams 22 constituting part of the said general framework or stationary frame structure 20 and on these I-beams there is carried the stationary supporting or main bearing 51 of a turntable construction 50 which includes not only said main bearing but also the bull gear or ring constituting a turntable 52 which is carried on said main bearing 51. This main bearing 51 is at fixed elevation and the bull gear or turntable 52 thereupon is driven through the medium of motivated power-transmission gearing generally designated as 53 of which there is indicated only the terminal gear element 54 thereof which directly engages the gear teeth 55 of the bull gear for actuating the latter. The gear driving mechanism for actuating such bull gear is well known and need not be further described herein.

In connection with that which has preceded, it will be pointed out that the lifting means collectively designated as 40 includes the heretofore mentioned expansible and contractible element designated as 41. This expansible and contractible element 41 embodies a fixed member or section 42 of constant elevation and a vertically movable piston element or section 48. As to the fixed member or section 42 this includes the center circular support tube 43, a cylinder head 45 secured to and carried from the lower end of the support tube 43, a lifting cylinder or cylindrical wall member 46 carried by, rising from, and having a liquid-tight connection with said head 45, and a piston rod guide 49 provided at and extending inwardly from the upper end of the cylindrical wall member 46—which member 49 is provided for guiding tubular piston rod 62 rising from piston head 61 of the vertically movable piston element or section 48. The piston head 61 and the tubular piston rod 62 rising therefrom are secured together in such a manner that a liquid-tight connection is provided between them. As to the vertically movable piston element or section 48, this includes or provides the aforementioned piston head 61 and the rising tubular piston rod 62. For effecting a lifting of the piston element 48 oil is supplied under pressure through the center support tube 43 through oil-flow openings 47 leading from the lower interior portion of the tube 43 into the region immediately over the cylinder head 45 and below the piston head 61 whereby to raise the piston element as and when required. These same openings provide passageways for the release or back-flow of oil into and upwardly within the flow-passageway 44 of the central support tube 43, to wit, when the pressure supply of oil to the center support tube 43 is cut off or released for backflow into and upwardly within the tube 43 whereby a consequent lowering of the liftable piston element and of the parts liftably carried thereby can take place.

As already mentioned the larger scale views of Fig. 16, 17 and 18 in conjunction with Fig. 4 bring out certain features of construction in a clear and definite manner. By Figs. 16 and 18 in conjunction with Fig. 4 one will appreciate how the support tube 43 is carried on or from the channel-shaped member 21—21 of the stationary frame structure 20. Also how the pipe or support tube 43 having a main oil-flow passageway 44 can function whereby during a lifting operation oil under pressure can have a forward flow through oil-flow passageways 47 into the space which is immediately above the head 45 of the lifting cylinder 42 and which is below the head 61 of the vertical liftable piston 48. These flow passageways 47 serve as back-flow passageways from said space into the main oil-flow passageway 44 as and when such back-flow is permitted because of oil pressure for that purpose.

Figs. 17 shows the arrangement of parts in the immediate vicinity of a central or inwardly-extending portion 57 of the turntable or bull gear 52. With respect to this figure it will be noted that the upper end of the depending drive or torque tube, designated as 71, is connected at or by a member 58 whereby the torque tube is carried from and driven by the bull gear 52; an auxiliary turntable construction collectively designated as 63 is supported on and at the upper end of the hollow piston rod 62 of the liftable piston element 48; this auxiliary turntable construction comprises a supporting bearing or liftable member 64 which is directly mounted upon the piston rod 62; the liftable supporting bearing 64 has a raceway 59 upon which there is a series of anti-friction rollers or balls 65 upon which there is turnably mounted the auxiliary turntable 67 having a raceway 66 resting on these balls whereby the auxiliary turntable 67 is turnably supported on the liftable base 64 through the medium of anti-friction means; this auxiliary turntable 67 in turn supports and carries therefrom the vertically-extending arm-carrying shaft 31 whereby said arm-carrying shaft can turn about and concentric with vertically-extending axis determined by the bull ring or gear 52 and whereby when the piston rod 62 of the movable piston element 48 is raised or lowered, as the case may be, there is a lifting or lowering of the auxiliary turntable 67 and thereby the shaft 31; the guide member 49 provided at the upper end of the fixed lifting cylinder 46 assures the maintaining of concentricity between the lifting cylinder 46 and the piston rod 62; and guide sleeve or guide ring 60 functionally provided between the bull gear 52, or between the upper end of the torque tube 71 which is connected to the bull gear 52 serves whereby concentricity is assured between them on the one hand and the liftable vertically-extending arm-carrying shaft 31 on the other end.

The bull gear or turntable 52 has a portion 57 extending inwardly from the supported bearing section thereof and to this inwardly-extending section or portion 57 there is connected at 58 the upper end of the depending torque tube 71 whereby the latter constitutes or provides a member driven by and depending from the bull gear. At the lower end 72 of this torque tube 71, or depending power-transmission shaft as it may be called, there are rigidly secured thereto hinge members or connecting elements 73 to which the ends 81 of outwardly-extending power-transmission arms 80 are connected whereby as said torque tube or shaft 71 is turned it effects horizontal turning movement about the aforesaid vertically-extending axis of the outwardly-extending power-transmission arms thus carried from the torque shaft 71.

Figure 6:
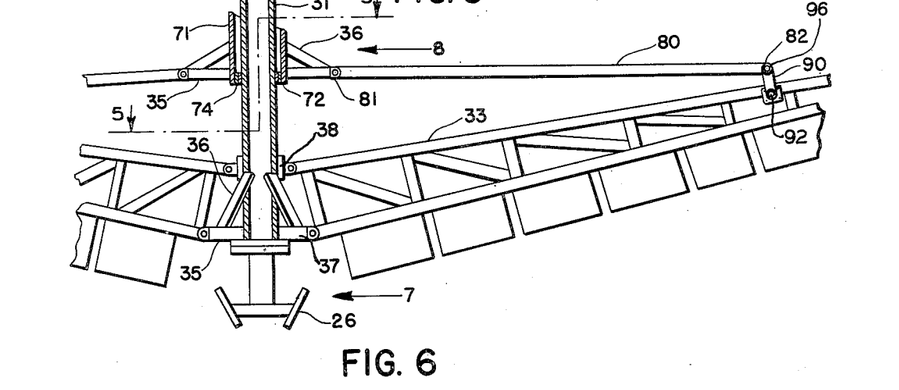
Fig. 6 is an elevational view of certain parts but in which certain vertically-extending tubular members are shown in section.

The outwardly-extending power-transmission arms 80 just referred to are in the form of members which are of V-shape or of modified V-shape formation, when viewed in plan, to wit, as shown in Figs. 2 and 6 thereof. These outwardly-extending arms 80 overlie the outwardly-extending rake arms 33 corresponding thereto and the small outer ends 82 of the power-transmission arms are connected at 34 through the medium of swingable links 90 to the corresponding rake arms 33 whereby the horizontally impelled rake movement can be transmitted to the rake arms 33 from the V-shaped arms 80 as the latter are caused to turn about the vertically-extending axis through the medium of the torque tube or shaft 71 to which they are connected and from which they are driven. The links 90 are provided to compensate for, or as otherwise expressed, to permit relative movement to take place between the outer ends 82 of the power-transmission arms 80 relative to the rake arms 33 corresponding thereto, as for example, when the rake arms are lifted from the low full line position of Fig. 1 to the dot and dash line position of Fig. 1.

Figure 7:
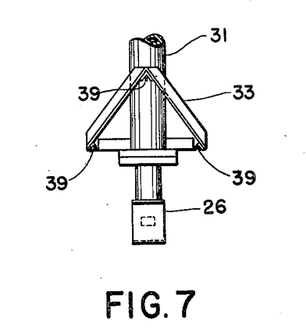
Figs. 7 and 8 are vertical detail views of certain parts shown in Figs. 5 and 6, Fig. 7 being a view looking in the direction of the arrow 7 of Fig. 6 and Fig. 8 being a view looking in the direction of arrows in Figs. 5 and 6.
Figure 8:
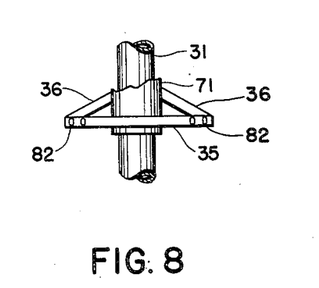
Figure 9:
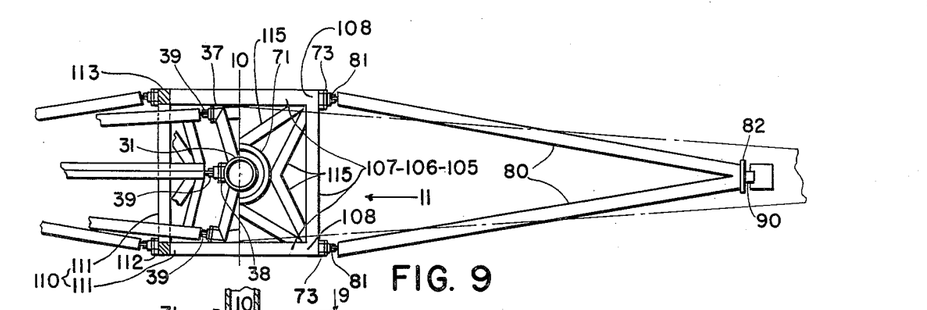
Fig. 9 is a view showing certain parts in plan looking downwardly from an upper elevation and certain parts looking downwardly from a lower elevation. This in fact shows the arrangement of parts as they appear below the horizontal planes of different elevations as indicated by the broken line 9—10—10—9 of Fig. 10 looking downwardly as indicated by the arrows at 9—9.
Figures 10, 11, 12, 13:
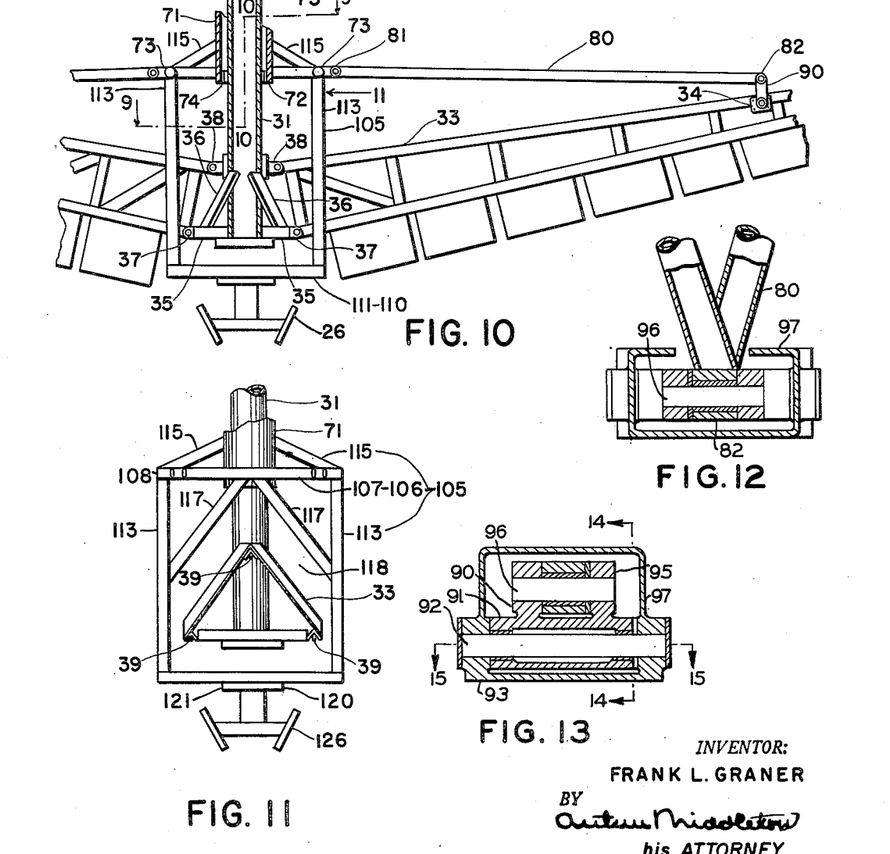
Fig. 10 is an elevational view in which certain vertically extending tubular members are indicated in section.
Fig. 11 is a vertical view of certain parts shown in Figs. 9 and 10 looking in the direction of arrows 11 of Figs. 9 and 10. Any showing of outwardly-extending power transmission arms 80 has been omitted from Fig. 11.
Figs. 12 to 15 inclusive are collectively illustrative of a detail of link construction employable in the raking mechanisms shown.
Figure 14:
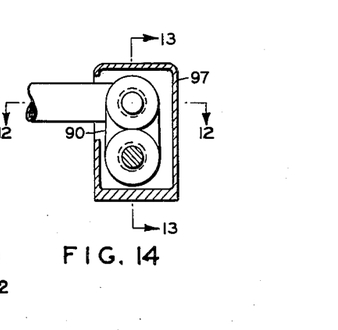
Figure 15:
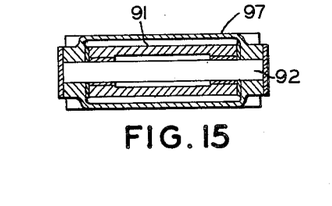

The general description thus far given applies to the forms shown in Figs. 1 to 8 and in Figs. 9 to 11 with the exception that with respect to the sump raking mechanism of the forms shown in Figs. 9 to 11 the sump raking mechanism thereof is connected either directly or indirectly to the torque tube structure and always remains in low sump raking position even when the outwardly-extending rake arms 33 are lifted from the low operative position therefor.

With respect to the lifting mechanism which is collectively designated as 40, it will be noted that as shown it is of a hydraulic type.

The tube 43 heretofore referred to and described as carrying at the lower end thereof the cylinder head 45 and by means of said head the rising cylinder or cylindrical wall member 46 collectively constitutes that which may be referred to as a fixed member or section 42 of the expansible and contractible lifting element or means 40. The upper end of cylinder 46 may be open to the atmosphere and surrounds the lower portion of the tubular member 43, the latter of which has the discharge openings 47 from which pressure liquid is supplied to and through the tubular member 43 into the cylinder 46 in the region immediately over the low cylinder head 45 but below the piston head 61.

Within the upwardly-extending cylinder 46 there is the movable piston element 60 embodying the piston head 61 having a sliding and watertight packing arrangement with the interior of the cylinder 46 and the exterior of the fixedly supported tube 43. A spacing means is provided between the cylinder head 45 and the piston head 61 whereby to insure at all times a liquid-receiving space into which pressure liquid can be passed as delivered through and from the discharge openings 47 at the lower end of the tube 43. Rising from the piston head 61 there is the tubular piston rod 62 carrying at the upper end thereof a supporting bearing member 64 or that which may be considered as a vertically positionable turntable base member of and that which has been herein referred to as a vertically positionable auxiliary turntable construction collectively designated as 63. This auxiliary base 64 has a raceway thereupon for the support of anti-friction rollers 65 which in turn support an upper turnably-supported bearing element 66 and upon the latter of which there is carried an auxiliary turntable 67, providing a cap member to and from which the shaft 31 of the rake-arm carrier 30 is dependably supported and carried through the medium of a detachble connection at 68.

The vertically-movable piston 60 which includes the piston head 61 and the piston rod 62 constitutes that which may be viewed as the vertically-movable element 48 of the expansible lifting means collectively designated as 40.

When the rake arms are to be elevated pressure liquid is supplied to and through the tube 43 in any suitable manner and from that which has preceded, it will be manifest that when pressure liquid is supplied into the region at the underside of the piston head 61 there can be effected a raising of the auxiliary turntable construction and therefrom through the medium of the detachable connection at 68 there can thus be effected a raising of the rest of the mechanical elements or parts constituting the rake-arm carrier 30 and rake arms 33 extending therefrom. The anti-friction rollers or balls 65 also permit a ready and easy turning of the rake-arm carrier and of the rakes extending therefrom as the latter are moved about the aforementioned vertically-extending axis through the medium of the outwardly extending power-transmission arms 80 as they are actuated from and through the medium of the depending torque tube 71 as the latter is driven by and from the bull gear or main turntable 52.

It has heretofore been pointed out that the exterior diameter of the rake-arm carrying shaft 31 is substantially less than the interior diameter of the depending torque tube 71 where a two-arm raking construction is employed. It is advisable to embody in the operating construction for the rakes a steady or guide bearing member as 74 which is interposed within the lower end section 72 of the torque tube 71 and an exterior portion of the vertically-tiltable rake-arm carrying shaft 31. The construction is such that concentricity between the upper end of the torque tube 71 and the rake-carrying shaft 31 is maintained at all times. With the steady guide bearing 74 just described, true concentricity is maintained at all times for said shafts and for all relative positions thereof. The main turntable construction 50 is such that the turntable 52 thereof always continues substantially seated in operative position whereby tilting thereof is avoided.

Figure 5:
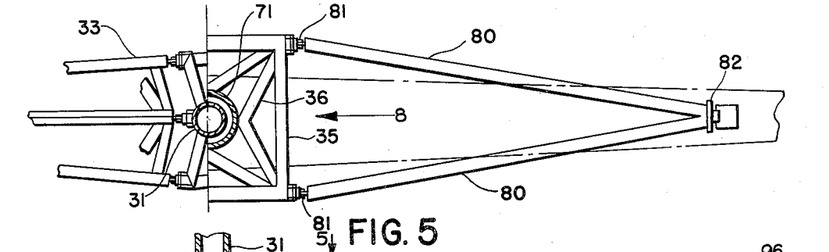
Fig. 5 is a view showing certain parts in plan looking downwardly from one elevation and of certain other parts in plan looking downwardly from another elevation. This in effect shows the arrangement of parts as they appear below planes indicated by the broken line 5—5 of Fig. 6, looking in the direction of the arrows.

Figs. 7 and 8 are provided to further illustrate certain details of construction and arrangement of the parts shown in operative position by Figs. 5 and 6. In connection with said Figs. 5 to 8 there is shown somewhat more clearly the manner in which the rake arms are secured to the carrying shaft 31 therefor whereby as the shaft 31 is elevated said rake arms 33 are moved therewith. In said figures there is also shown more clearly the V-shaped or modified V-shaped power-transmission arm (or arms) construction 80 whereby the rake arms through the medium of links 90 are turned about the vertically-extending main axis, and whereby the power for actuating the rake arms 33 is transmitted to the latter in any of the several vertically-adjusted positions therefor.

In connection with Figs. 1 and 4 to 8 inclusive, it will be noted that the rake arm carrying shaft 31 is liftable and thus operable to raise the rake arms 33 relative to the floor 11 of the tank upon abnormally heavy raking overload conditions being encountered and also to raise the sump rakes 26 a corresponding distance from and with respect to the sump or depressed floor portion 16 of the tank.

In the modified form of Figs. 9, 10 and 11 there is a set 126 of sump rakes not connected to the liftable rake arm carrying shaft but instead having a carrying and driven connecting means in the form of a non-liftable cage 105 provided between the turnably mounted torque tube 71 of constant elevation and the sump rakes 126. The torque tube is driven for imparting turning movement to the rake arms 33 through the medium of the power transmission arms 80 overlying the rake arms and providing for driving the latter as heretofore described.

In connection with the modified form of Figs. 9, 10 and 11 it will thusly be appreciated that said sump rakes 126 function at a low but constant elevation for all raking operations performed thereby. The modified form of construction is of novel formation purposely designed to permit the rake arms 33 to be elevated with respect to the non-liftable sump rakes 126 and such novel structure is hereinafter specifically described.

An inspection of Figs. 9 to 11, inclusive, will readily disclose the cage 105 heretofore mentioned and illustrate a form of construction by which the sump rakes or sump raking mechanism as 126 can be carried by and actuated from the depending torque tube whereby such sump rakes will always remain in non-elevated or low operative position. The cage 105 for accomplishing this desired end embodies an upper frame member 106 made up of four horizontal members 107 assembled in the form of a hollow square and rigidly connected at the outer ends or corner portions 109 of the square. It also embodies a lower frame member 110 made up of four horizontal members 111 assembled in the form of a hollow square and rigidly connected at the outer ends or corner portions 112 of the square. Four vertically-extending corner uprights 113 are provided between the corresponding corner portions of the upper and lower frame and are rigidly connected thereto so as to result in a relatively rigid cage main frame. Downwardly and outwardly-extending carrying members as 115 are provided, of which the upper inner ends thereof are connected to the lower end portion of the torque tube 71 while the lower outer ends of these carrying members 115 are rigidly connected to the upper frame member 106. The cage is also provided with braces as 117 for imparting further rigidity to the cage construction. "Window" portions, as 118, are provided in the cage for the passing therefrom and for the reception therein of the rake arm 33—in this connection see Fig. 11—from which it will be noted that each rake arm 33 can have imparted thereto an unobstructed lifting movement within the window 118 corresponding thereto so that there will be no obstruction restricting the requisite movement of the rake arms in the diverse operating positions therefor. At 120 there is indicated a connection locality whereat a flanged stem portion 121 of the sediment rakes 126 is rigidly secured to the lower portion of the cage 105 whereby the rakes will be positively turned for imparting a sediment raking operation consequent to any turning movement imparted thereto from the torque tube 71 through the medium of the cage 105 just described.

In Figs. 12 to 15 inclusive, there is shown a link construction which can be embodied in sediment-raking mechanism and in this connection it will be noted that the links 90 have a relatively broad lower end 91 which is mounted on pivot pin 92 locatable at the point 34 of Fig. 1. This pivot pin is carried in a frame or body member 93 which can be secured in any suitable manner to the rake arm, to wit, in a manner whereby the pivot pin extends horizontally and in a direction crosswise of the arm. It will also be observed that the upper end 95 of the link is connected through the medium of a pin 96 to the outer end section 82 of a power-transmission arm 80. Also in the construction shown there is indicated a casing or covering element 97 providing a hollow structure for protecting the link and its bearings from wear because of settling material which might otherwise drop thereupon or thereinto. This hinge construction described herein is of a character that permits the proper in and out movement of the outer ends of the power-transmission arms as required when the rake arms are lifted. The link construction shown also is well adapted for preventing any lateral movement of the rake arms 33 relative to the outer end section 82 of the power-transmission arms.

The rake arms carry the usual depending raking blades or sediment-impelling elements as 100 and which function during a forward turning of the rakes to impel sedimented material towards and into the sump 15.

From what has preceded, it will be readily understood that according to operative requirements the rake arms can be raised to avoid excessive overload raking conditions and that in each and all positions therefor, either when raised or lowered, or when being raised or lowered, they are driven through the medium of the depending torque tube 71 as it is turned by and from the turntable or bull gear 52 and the outwardly-extending power-transmission arms 80 which are turnably connected to the lower end of the torque tube so as to be bodily driven thereby and of which arms the outer ends thereof each has a link connection at 82 to a corresponding rake-carrying arm 33.

While the illustrated examples constitute practical embodiments of the invention, nevertheless it is to be understood that the invention is not limited precisely to the details of the construction or design since manifestly the same may be considerably varied without departing from the spirit of the invention as defined in and by the appended claims.

Having thus described the invention hereof, I claim:

1. A sediment-raking mechanism for employment in a settling tank having stationary means fixedly positioned with respect to the tank and functionable as means for supporting said mechanism, which said mechanism when in place and in operative position with respect to the tank comprises in combination and in operative relationship a plurality of outwardly-extending rake arms which in plan have symmetrical arrangement with respect to each other and are horizontally turnable as a set about a vertically-extending axis; a vertically-extending rake-arm carrier mounted for turnable movement about said axis; lifting means deriving carrying support from said stationary means and having a member turnable about said axis, and in turn providing lifting and carrying support for and applied at the upper end portion of the rake-arm carrier whereby the latter serves as a turnable depending member functioning under tension and from the lower portion of which said rake arms are carried; a turntable construction having a base member deriving support from said stationary means and a turntable mounted on said base member for turnable movement about said axis; motivating means for imparting said turnable movement to said turntable; a vertically-extending power transmission torque tube carried by and extending downwardly from said turntable and concentrically disposed with respect to liftable rake-arm carrier; a circular guide sleeve functionally disposed between the upper portion of the torque tube and an upper portion of the liftable rake-arm carrier; a circular steady bearing functionally disposed between the lower end portion of the torque tube and a low portion of the rake-arm carrier on the other hand whereby to insure continued concentricity between them; outwardly-extending relatively stiff power-transmission arms corresponding in number to the aforementioned rake arms and vertically positioned with respect to the latter; hinge means of which the pintle axes extend horizontally and are provided for connecting the inner end of each power-transmission arm to a lower portion of the torque tube; and connecting means at the outer end of each power-transmission arm by which it is so connected to its corresponding rake arm that there is permitted movement of the outer end of each power-transmission arm relative to and along the rake arm to which it corresponds as the rake arms are raised as a set but so as to prevent lateral movement between the outer ends of each power-transmission arm relative to the rake arm to which it is connected.

2. A sediment-raking mechanism as defined in and by claim 1 in which the outwardly-extending rake arms are two in number.

3. A sediment-raking mechanism as defined in and by claim 1 in which the connecting means at the outer ends of each power-transmission arm embodies a connecting link of which one end portion of the link has a pivotal connection with the outer end of the power-transmission arm while the other end of the link has a pivotal connection with the corresponding rake arm.

4. A sediment-raking mechanism as defined in and by claim 1 in which the lower end of the depending torque tube is equipped with outwardly-extending means for affording carrying support for the outwardly-extending power-transmission arms; in which the power-transmission arms are V-shaped in plan and are disposed with the vertexes of the V's outermost; in which the hinge means for each said power-transmission arm provides pivotal connections between the aforementioned outwardly-extending means and the spaced inner ends of each V portion thereof; and in which the vertex portion of each V-shaped arm is the portion for which there is provided a connection means with the corresponding rake arm and which means is of character to permit movement of the outer end of each power-transmission arm in a radial direction and relative to its corresponding rake arm as the rake arms are vertically moved as a set.

5. A sediment-raking mechanism comprising in combination and in operative relationship a set of rigidly connected rake-carrying arms which when in operative position with respect to a liquid-holding receptacle is horizontally turnable about a vertically-extending axis and of which set the arms extend outwardly with respect to said axis and in plan have symmetrical arrangement with respect to each other; a vertically-extending liftable rake-arm carrier concentric with said axis, functioning under tension, and providing at the lower end thereof carrying support for said arms; lifting means which when in place derive carrying support from a stationary means fixedly positioned with respect to the receptacle and includes a raisable and lowerable member having mechanical connection with the upper portion of the liftable rake-arm carrier whereby the latter derives carrying and lifting support from said raisable and lowerable member; a turntable construction of fixed elevation embodying a base deriving carrying support therefor from said stationary means and also embodying a turntable mounted on said base and which when actuated turns about and also determines the location of said vertical axis; motivating means for imparting driven turning movement to the turntable about said axis; power-transmission means of which the upper end portion is connected to and driven by said turntable and provides a depending driven torque tube concentric with said axis; a guide ring between the upper end of said driven torque tube and an upper portion of the liftable rake-arm carrier whereby to maintain the upper portion of the latter under concentric relationship with respect to the upper end of the torque tube; a steady bearing disposed between the lower end of the torque tube and a lower portion of the liftable rake-arm carrier whereby to maintain concentric relationship between them; outwardly-extending power-transmission arms corresponding in number to the aforementioned rake arms and vertically positioned with respect to the latter; hinge means having horizontally-extending pintle axis through the medium of which the inner end portion of each of said power-transmission arms is hingedly connected to a lower portion of the depending torque tube; and connecting means at the outer end of each power-transmission arm by which each power-transmission arm is connected to a corresponding rake arm with which it is associated, said connecting means being constructed so as to permit inward or outward movement as the case may be of the outer ends of the power-transmission arms relative to the rake arm to which it corresponds as the rake arms are vertically moved as a set and also so as to prevent lateral movement of the outer ends of the power-transmission arms relative to the corresponding rake arms.

6. A sediment-raking mechanism adaptable for employment in a settling tank having stationary means fixedly positioned with respect to the tank and functionable as means for supporting said mechanism, which said mechanism when in place and in operative position with respect to such tank comprises in combination to main turntable construction having a main base carried by said supporting means, and a power-actuated main turntable mounted on said base so as to have uni-directional horizontal turning movement about a vertically-extending axial line; motivated means for imparting such movement to said turntable; an auxiliary turntable construction having an auxiliary base and an auxiliary turntable mounted upon said auxiliary base whereby there is provision for supported turning movement of the auxiliary turntable about a vertical axial line substantially in axial alignment with the axial line of the main turntable; lifting means suitably supported from said stationary means and provided for raising said auxiliary base relative to said main base; a depending arm carrier constituting a depending member functioning under tension and deriving support from said auxiliary turntable; a plurality of rake arms extending outwardly from and in turn deriving support from a lower portion of said arm carrier, said rake arms being uniformly spaced with respect to each other and connected so as to move as a set; a vertically- extending power-transmission member constituting a depending member functioning under torsional strain whose upper portion is connected to said main turntable so as to be driven thereby as the latter is turned; a steady bearing provided at and between the lower portion of the power-transmission means and the depending member functionable under tension for assuring continued concentricity between the members just mentioned; relatively stiff downwardly- and outwardly-extending power-transmission arms corresponding in number to the number of the aforesaid rake arms and overlying the latter, hinge means functionally disposed between the lower end portion of the vertically-extending power-transmission member and the downwardly- and outwardly-extending power-transmission arms, the pintle axis of each of which hinge means extends horizontally and being thereby disposed whereby the outer ends of the power-transmission arms can have swinging movement only upwardly and downwardly; means by which the outer end portion of each outwardly-extending power-transmission arm is connected in a manner that permits upward and outward movement of the outer end portion of the power-transmission arm relative to the corresponding rake arm as the rake arms as a set are raised but so as to prevent lateral movement between the power-transmission arms and the rake arms to which they are respectively connected.

7. A sediment-raking mechanism of the class described, comprising in combination and in operative relationship a plurality of rake arms horizontally turnable as a set about a vertically-extending axial line and in plan symmetrically arranged; a vertically-extending and vertically-liftable rake-arm carrier having carrying support therefor applied at the upper portion thereof providing a depending member functioning under tension from the lower portion of which said rake arms are carried whereby they have turning movement as a set about said axial line; a turntable construction embodying a suitably supported base member and a turntable mounted on said base member so as to be turnable about said axial line; motivating means for imparting the turning movement to said turntable about said axial line; a vertically-extending power-transmission member concentrically disposed with respect to said rake-arm carrier, as to which power-transmission member the upper end thereof is connected to and driven from said turntable whereby a depending portion of said power-transmission member functions as a torque member; stiff outwardly-extending power-transmission arms corresponding in number to the aforementioned rake arms and vertically positioned with respect to the latter; hinge means for the inner end of each said power-transmission arm by which it is pivotally connected to the lower portion of the torque member, the pintle axis of which hinge means extends horizontally; means between the upper end portion of the torque member and an upper portion of the rake-arm carrier whereby to maintain the same in concentric relationship; lifting means for raising said rake carrier by forces applied to the upper portion of the latter; and an upwardly-extending power-transmission link at and for the outer end of each said power-transmission arm of which the upper end of each link is pivotally connected to the power-transmission arm while the lower end of each link is pivotally connected to and supported from a corresponding rake arm whereby to permit only inward and outward swinging movement of the upper ends of the links as the rake arms as a set are raised.

8. A sediment-raking mechanism adaptable for employment in conjunction with a settling tank with which there is an associated stationary means for supporting a sediment-raking mechanism when the latter is in operative position with respect to the tank which said sediment-raking mechanism comprises in combination a main turntable construction of constant elevation having a stationary base and a power actuated main turntable mounted on said base so as to have uni-directional horizontal turning movement about a vertically-extending axial line, and of which the base when in operative position derives carrying support from said associated stationary means; motivated means for imparting said horizontal turning movement to said main turntable; an auxiliary turntable construction comprising a liftable base and an auxiliary turntable mounted on said liftable base in a manner whereby there is provision for horizontal turning movement of the auxiliary turntable about a vertical axial line substantially in alignment with said axial line of the main turntable; lifting means deriving support therefor from the stationary means associated with the tank and which lifting means in turn is provided for supporting and raising said liftable base; a rake-arm carrier embodying a depending inner shaft functioning under tension and deriving support from said auxiliary turntable; rake arms extending outwardly and deriving support from the lower portion of said carrier; a drive member embodying a depending outer tubular member functioning under torsional strains, the upper end portion of which is connected to said main turntable so as to be supported therefrom and driven thereby as the main turntable is turned and also embodying an outwardly-extending construction rigidly connected to the lower end portion of the torque tube means, outwardly-extending power-transmission arms V-shaped in plan and disposed with the vertex thereof outermost; means providing hinge connection between said outwardly-extending construction and the spaced free ends of the V portions of each power-transmission arm; and a swingable connecting link for each power-transmission arm and rake-arm corresponding thereto whereby horizontal turning movement about the vertically-extending axial line can be transmitted from the several power-transmission arms through the medium of said links to the corresponding rake arms as a set and with respect to which links the upper end portion of each is connected to the outer end portion of its corresponding power-transmission arm while its lower end portion is connected to the corresponding rake arm whereby to impart thereto the requisite turning movements during the diverse positions of elevation therefor.

9. A sedimentation unit comprising a tank having a bottom and a marginal wall rising therefrom; means for supplying liquid-solids mixture to the tank, supernatant liquid withdrawal means leading from the upper portion of the tank, a sediment-discharge means leading from said bottom, supporting means fixedly positioned with respect to the tank and a horizontally-turnable sediment-raking mechanism for impelling sedimented material towards the intake section of said sediment-discharge means; which said raking mechanism comprises a main turntable construction of constant elevation having a stationary base carried by said supporting means and a power-actuated main turntable mounted on said main stationary base so as to have uni-directional horizontal turning movement about a vertically-extending axial line; motivated means for imparting said horizontal turning movement to said turntable; an auxiliary turntable construction comprising a liftable base and an auxiliary turntable mounted upon said liftable base in a manner whereby there is provision for horizontal turning movement of the auxiliary turntable about a vertical axial line substantially in alignment with said axial line of the main turntable; lifting means deriving carrying support therefor from the supporting means fixedly positioned with respect to the tank and which lifting means is provided for supporting and raising said liftable base; a vertically-extending rake-arm carrier functioning under vertical loading and deriving support from said auxiliary turntable which is turnably mounted on said liftable base; rake-arms extending outwardly and deriving carrying support from said carrier; a power-transmitting member functioning under torsional strains of which one portion is connected to said main turntable so as to be driven thereby as the main turntable is turned; vertically-swingable outwardly-extending relatively rigid power-transmission arms vertically arranged with respect to corresponding rake arms; hinge connecting means for and between the inner portion of each power-transmission arm on the one hand and a corresponding low portion of the power-transmitting member on the other hand and constructed and installed for permitting of substantially only a vertical movement for the outer end of the power-transmission arm; and for each power-transmission arm and rake arm corresponding thereto an upwardly-extending swingable connecting link the upper end of which link is connected to the outer end of the power-transmission arm while the lower end is connected to the corresponding rake arm in a manner whereby to have only inward and outward swinging movement but whereby it is otherwise relatively rigid for imparting horizontal turning movement from the outer end of the power-transmission arm to the corresponding rake arm in the diverse positions of elevation for the latter.

10. A sedimentation unit according to claim 9, in which there is carried by and horizontally turnable with the liftable rake-arm carrier an auxiliary rake for functioning in the immediate region of the intake of the sediment-discharge means.

11. A sedimentation unit comprising a tank having a bottom with a depressed portion providing a sediment-receiving sump in the central portion thereof, a marginal wall rising from said bottom, means for supplying liquid suspension to the tank, means for passing supernatant liquid from the tank; a sediment-discharge leading from said sump, supporting means fixedly positioned with respect to the tank for supporting sediment-raking mechanism hereinafter referred to, and a horizontally-turnable sediment-raking mechanism comprising a main turntable construction having a stationary base carried by said supporting means and a power-actuated main turntable having a central opening extending therethrough and mounted on said main stationary base so as to have uni-directional horizontal turning movement about a vertically-extending axial line; motivated means for imparting turning movement to said main turntable; an auxiliary turntable construction comprising a liftable base and an auxiliary turntable mounted upon said liftable base whereby there is provision for turning movement of the auxiliary turntable about a vertical axial line substantially in alignment with the axial line of the main turntable; lifting means for raising said liftable base; a depending rake-arm carrier embodying a vertically-extending shaft functioning under tension and deriving support from said auxiliary turntable; rake-arms extending outwardly and deriving support from a lower portion of said shaft; a depending power-transmission member providing a tube surrounding but spaced from said shaft and functioning under torsional strains, the upper end portion of which tube is connected to said main turntable so as to be driven thereby as the main turntable is turned and equipped at the lower end portion thereof with outwardly-extending means for affording driving support for the power-transmission arms immediately hereinafter referred to; outwardly-extending power-transmission arms V-shaped in plan and disposed with the vertex of the V outermost; hinge means for each of said power-transmission arms disposed with the pintle axes extending horizontally and serving as connecting means between the spaced ends of the V-portion thereof and said outwardly-extending means; also a swingable connecting link for each of said power-transmission arms between the outer end thereof and a rake arm corresponding thereto of which an upper portion of the connecting link has a pivotal connection with the outer end of the power-transmission arm while the lower end of said connecting link has a pivotal connection to the corresponding rake arm.

12. A sedimentation unit comprising a tank having a bottom and a marginal wall rising therefrom; means for supplying liquid-solids mixture to the tank, supernatant liquid withdrawal means leading from the upper portion of the tank, a sediment-discharge means leading from said bottom supporting means fixedly positioned with respect to the tank and in operative position with respect to the foregoing a horizontally-turnable sediment-raking mechanism for impelling sedimented material towards the intake section of said sediment-discharge means; which said raking mechanism comprises in combination a main turntable construction of constant elevation having a stationary base carried by said supporting means and a power-actuated main turntable mounted on said main stationary base so as to have uni-directional horizontal turning movement about a vertically-extending axial line; motivated means for imparting said turning movement to said turntable; an auxiliary turntable construction comprising a liftable base and an auxiliary turntable mounted upon said liftable base in a manner whereby there is provision for horizontal turning movement of the auxiliary turntable about a vertical axial line substantially in alignment with said axial line of the main turntable; lifting means for supporting and raising said liftable base; a depending rake-arm carrying shaft functioning under tension and deriving support from said auxiliary turntable; rake-arms extending outwardly and deriving support from a lower portion of said carrying shaft; a depending tubular drive member functioning under torsional strains the upper end portion of which is connected to said main turntable so as to be driven thereby as the main turntable is turned and the lower end of which is equipped with outwardly-extending means for affording driving support for power-transmission arms; outwardly-extending power-transmission arms V-shaped in plan and disposed with the vertex of the V outermost; means providing for each said power-transmission arm pivotal connections between the spaced free ends of the V-portions thereof and said outwardly-extending means; and a swingable connection link for each power-transmission arm and a rake arm corresponding thereto of which one end of the link is connected to the outer end of the power-transmission arm while the other end portion of the link is connected for imparting turning movement to the corresponding rake arm in diverse positions of elevation therefor.

13. A sedimentation unit comprising a tank having a bottom with a depressed portion providing a sediment-receiving sump in the central portion thereof, a marginal wall rising from said bottom, means for supplying liquid-solids mixture to the tank, supernatant liquid withdrawal means leading from the upper portion of the tank, a sediment-discharge leading from said sump; stationary supporting means fixedly positioned with respect to the tank and in operative position with respect to the foregoing a sediment-raking mechanism comprising in combination a main turntable construction of constant elevation having a stationary main base carried by said supporting means and a power-actuated turntable movably mounted on said main base member so as to have horizontal turning movement about a vertically-extending axial line; motivated means for imparting uni-directional horizontal turning movement to said turntable; an auxiliary turntable construction comprising a vertically positionable auxiliary base and an associated auxiliary turntable mounted upon said auxiliary base whereby to have horizontal turning movement about a vertical axial line substantially in alignment with said axial line of the main turntable construction; lifting means deriving support from said stationary supporting means and having a liftable member for raising said auxiliary base member from a low normal operative position therefor with respect to the tank bottom; a depending rake-arm carrier deriving support from said auxiliary turntable; rake-arms supported from a lower end portion of said carrier and extending outwardly therefrom; a depending torsion member of which the upper end portion is connected to said main turntable so as to be carried therefrom and driven thereby as the main turntable is turned; outwardly-extending power-transmission members the inner ends of which are connected to corresponding low portions of the depending torsion member; and a connection link for each outwardly-extending power-transmission and rake-arm corresponding thereto of which one end portion of the connecting link has a pivotal connection with the outer end of the outwardly-extending power-transmission member while the other end portion of said connecting link has a pivotal connection to the corresponding rake arm whereby to impart forward turning movement from the outer end of the outwardly-extending power-transmission member to the rake arm in the several elevated positions therefor as and while the depending torsion member is being turned by the power-actuated turntable.

14. A sediment-raking mechanism of the class described, comprising in combination and operative relationship a stationary bearing member; a movable main bearing member mounted on said stationary main bearing member for horizontal turning movement about a vertically-extending axial line; motivating means for imparting said turning movement to said movable bearing member; a vertically-extending power-transmission member the upper end of which is connected to said movable main bearing member so as to be turnably driven and supported thereby whereby said power-transmission member functions as a depending member under torsional strain; a vertically-extending vertically-liftable rake-arm carrier having liftable support applied to the upper end portion thereof whereby said rake-arm carrier constitutes a depending arm-carrying member functioning under tension; guiding means disposed between the movable bearing member on the one hand and an upper portion of the rake-arm carrier on the other hand for maintaining said upper guided portion of the latter in concentric relationship with respect to said movable bearing member and the upper portion of the power-transmission member as carried by the latter; lifting means having a stationary element and a liftable element provided for raising the rake-arm carrier by forces applied to the upper end portion of the latter; a plurality of rake arms extending outwardly from and in turn deriving support from the lower portion of said arm carrier connected so as to move as a set and in plan uniformly disposed with respect to each other; outwardly-extending relatively stiff power-transmission arms corresponding in number to rake arms underlying the same; hinge means for the inner ends for each of said power-transmission arms by which the inner end is pivotally connected to a lower portion of the power-transmission member, of which hinge means the pintle axis of each extends horizontally whereby the outer ends of the power-transmission arm can have swingable movement in vertical but not in lateral direction; and means by which the outer end of each power-transmission arm is connected to a corresponding rake arm in a manner that permits upward and outward movement thereof with respect to the rake arm to which it corresponds but which connection is such as to prevent lateral horizontal movement between the outer end of such power-transmission arm and the rake arm to which it is connected.

15. A sedimentation unit according to claim 9, in which there is carried by and horizontally turnable with the power-transmission member an auxiliary rake for functioning in the immediate region of the intake of the sediment-discharge means.

FRANK L. GRANER.

REFERENCES CITED

The following references are of record in the file of this patent:

UNITED STATES PATENTS

| Number | Name | Date |
|---|---|---|
| 1,131,222 | Dorr | Mar. 9, 1915 |
| 1,702,192 | Blomfield et al. | Feb. 12, 1929 |
| 1,702,193 | Blomfield et al. | Feb. 12, 1929 |
| 1,960,707 | Logue et al. | May 29, 1934 |
| 2,064,151 | Coulter | Dec. 15, 1936 |
| 2,087,725 | Scott | July 20, 1937 |
| 2,291,836 | Scott | Aug. 4, 1942 |
| 2,360,817 | Scott | Oct. 17, 1944 |